3,510,444
FILLED EPIHALOHYDRIN POLYMERS
Edwin J. Vandenberg and William D. Willis, Wilmington, Del., assignors to Hercules Incorporated, a corporation of Delaware
No Drawing. Filed Apr. 26, 1966, Ser. No. 545,264
Int. Cl. C08g 51/04; C08k 1/08
U.S. Cl. 260—37     10 Claims

ABSTRACT OF THE DISCLOSURE

A cross-linked, siliceous-filled epihalohydrin homopolymer or copolymer with at least one other epoxide is improved by the addition of an amino- or mercapto-substituted silane either before or during compounding. These products have increased modulus and tear strength as well as better flex life and improved elastic recovery.

---

This invention relates to cross-linked epihalohydrin polymers. More particularly, this invention relates to epihalohydrin polymers containing siliceous reinforcing fillers and a reactive silane.

It is known that high molecular weight polymers and copolymers of epihalohydrin can be cross-linked with urea, thiourea, ammonia, various polyamines or certain heterocyclic compounds in combination with a metal compound to produce rubbers that have numerous good attributes. It is also known that the presence of a reinforcing filler is beneficial.

Now in accordance with this invention, it has unexpectedly been found that certain physical properties of cross-linked siliceous-filled epihalohydrin polymers are improved when a small amount of a reactive silane is added to the siliceous filler either before or during compounding. In particular, a small amount of a reactive silane, having the formula $R_3SiZ$ wherein at least one R is an amino- or mercapto-substituted organic radical attached to silicon through a Si-C linkage and the other R's are the same or alkyl, arylalkyl, alkaryl, alkoxy, aryloxy, cycloalkoxy, arylalkoxy, alkanoyloxy or halogen and Z is alkoxy, aryloxy, cycloalkoxy, arylalkoxy, alkanoyloxy or halogen, has been found to yield products having higher modulus and tear strength, better flex life, increased heat-aging resistance and improved elastic recovery. These improved properties are advantageous for many uses of epihalohydrin polymers and particularly desirable in elastic fiber applications.

Any high molecular weight polymer of an epihalohydrin is suitable for the purpose of this invention. Such polymers can be homopolymers prepared by polymerizing a monomeric epihalohydrin, e.g., epifluorohydrin, epichlorohydrin, epibromohydrin, or epiiodohydrin. They can also be copolymers in which the repeating units are derived from mixtures in any proportion of two or more molecular species of monomeric epihalohydrin, such as for example, mixtures of epichlorohydrin and epibromohydrin or mixtures of epibromohydrin, epifluorohydrin and epiiodohydrin. They can also be copolymers of epihalohydrins with one or more epoxides in which at least about 20%, preferably at least about 50%, by weight of the repeating units are derived from epihalohydrins, such as for example, a copolymer of propylene oxide and epichlorohydrin, a copolymer of ethylene oxide and epichlorohydrin, terpolymer of propylene oxide, ethylene oxide and epichlorohydrin or a terpolymer of allyl glycidyl ether, propylene oxide and epichlorohydrin. They can also be mixtures of homopolymers and copolymers or terpolymers in any proportions desired. The polymer can be essentially wholly amorphous, a mixture of amorphous and crystalline polymers or essentially wholly crystalline. Generally, the amorphous polymers provide the most rubbery products. However, excellent rubbery products are obtained from mixtures of amorphous and crystalline polymers. In this case the amount of the crystallinity will preferably be less than about 30% by weight of the polymer or mixture of polymers.

The epihalohydrin polymers of this invention are essentially linear polyethers in which polymerization, at least in major part, has taken place through the epoxide linkage so that the polymer contains halomethyl groups attached to the main polymer chain. The homopolymers are believed to have the following general formula:

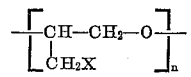

in which X is halogen and $n$ is a numeral designating the number of repeating units in the polymer. In the same way, when an epihalohydrin is copolymerized with one or more other epoxides (including other epihalohydrins), polymerization takes place through the epoxide linkage even though other polymerizable groups may be present, and it is apparent that such copolymers also contain halomethyl groups attached to the main polymer chain.

Typical of other epoxides that can be copolymerized with epihalohydrins to produce the polymers used in this invention include, by way of example, the alkylene oxides such as ethylene oxide, propylene oxide, butene-1 oxide, cis- and transbutene 12 oxides, hexene-1 oxide, hexene-2 oxide dodecene-1 oxide, isobutylene epoxide, and the like; cycloaliphatic epoxides such as cyclohexene oxides, vinyl cyclohexene oxides (both mono and dioxides) α-pinene epoxide, dipentene epoxide, and the like; epoxy ethers such as ethyl glycidyl ether, isopropyl glycidyl ether, tert-butyl glycidyl ether, phenylglycidyl ether, chlorophenyl glycidyl ether, 2-chloroethyl glycidyl ether, ethylphenyl glycidyl ether, vinyl glycidyl ether, allyl glycidyl ether, methallyl glycidyl ether, vinyl cyclohexyl glycidyl ether, o-allylphenyl glycidyl ether, p-vinybenzyl glycidyl ether, and the like; ethylenically unsaturated glycidyl esters such as glycidyl crotonate, glycidyl oleate, glycidyl methacrylate, and the like; and other epoxides such as, for example, styrene oxide, α-methylstyrene oxide, butadiene monoxide, butadiene dioxide, epoxy stearates, 3,4,-epoxy-1-pentene, 3,4 - epoxy - 1 - vinylcyclohexene, divinylbenzyl monoxide, and the like.

The epihalohydrin polymers used in this invention are characterized by having a weight average molecular weight of at least 40,000 and preferably at least about 100,000. Molecular weights of this order ususally correspond to reduced specific viscosity, $\eta_{sp./c.}$, of at least about 0.5. Reduced specific viscosities are generally determined on solutions of the polymers at 0.1% concentration in α-chloronaphthalene at 100° C., although polymers high in epifluorohydrin content are preferably determined on solutions thereof at 0.1% concentration in cyclohexanone at 50° C.

The polymers employed in this invention can be prepared by contacting an epihalohydrin monomer, mixture, of epihalohydrin monomers, or mixture of epihalohydrin monomer and at least one other epoxide with an organoaluminum compound, preferably one which has been reacted with about 0.01 to about 1.5 moles of a chelating agent such as acetylacetone, benzoylacetone, acetoacetic acid, ethyl glycolate, oxalic acid, glyoxal monoxime, etc. and/or reacted with from about 0.1 to about 1.5 moles of water per mole of the organoaluminum compound. Exemplary of the organoaluminum compounds that can be so reacted with the chelating agent and/or water and used as a catalyst are triethylaluminum, triisobutylaluminum, diethylaluminum hydride, etc.

The polymerization reaction is generally carried out in the presence of an inert, liquid, organic diluent but can be carried out in an essentially bulk polymerization process. Suitable diluents which can be used for the polymerization are the ethers, halogenated hydrocarbons, hydrocarbons, and mixtures of such diluents. The temperature of the polymerization process can be varied over a wide range, generally from about −80° C. to about 250° C., and while atmospheric pressure is usually used, the pressure can be varied from subatmospheric up to several atmospheres.

These epihalohydrin polymers generally contain a small amount (i.e., from about 0.1% to about 2% by weight) of antioxidant added at the time of their preparation. It may in some cases be desirable to add a small additional amount of antioxidant at the time of cross-linking the polymer. Exemplary of the most preferred antioxidants are phenyl-β-naphthylamine, di-β-naphthyl-p-phenylenediamine, sym - di - β - naphthyl-p-phenylenediamine, N-isooctyl-p-aminophenol, the reaction product of diphenylamine and acetone, polymerized trimethyldihydroquinoline, nickel dibutyldithiocarbamate, 4,4′-thio-bis(6-tert-butyl-m-cresol), the reaction product of crotonaldehyde and 3-methyl-6-tert-butyl phenol, etc.

As pointed out above, various polyamines can be used as cross-linking agents for epihalohydrin polymers. Exemplary of such polyamines are aliphatic amines such as ethylenediamine, propylenediamine, tetramethylenediamine, hexamethylenediamine, diethylenetriamine, etc.; cycloaliphatic amines such as melamine, piperazine, pyrazine, etc.; aromatic amines such as p-phenylenediamine, naphthalenediamine, biphenyldiamine, etc., and polymeric amines such as poly(2-methyl-5-vinyl pyridine), etc. Instead of the free amine, a salt of the amine can be used. Internal salts of the amines can also be used as, for example, hexamethylenediamine carbamate, which type of salt decomposes to the free amine at or below the curing temperature. In addition to the polyamines, the epihalohydrin polymers can be cross-linked with a heterocyclic compound selected from the group consisting of 2-mercaptoimidazolines and 2-mercaptopyrimidines in combination with at least one metal compound selected from the group consisting of salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table (Lange's Handbook of Chemistry, 8th edition, pages 56–57, 1952). In addition to the above cross-linking agents, urea, thiourea, ammonia and ammonium salts can also be used.

When cross-linking with a urea, thiourea, ammonia or polyamine, the amount employed will depend primarily upon the degree of cross-linking desired. Generally, from about 0.25% to about 10% and preferably from about 0.5% to about 5% based on the weight of the polymer will be employed. When using a heterocyclic compound in combination with a metal compound to effect cross-linking, the optimum amount of each compound will again depend upon the degree of cross-linking desired. Generally, however, the amounts added (based on the weight of the polymer) will be within the following ranges: metal compound from about 2% to about 20%; heterocyclic compound from about 0.2% to about 10%.

Any siliceous type filler can be used in accordance with this invention. Exemplary siliceous fillers are finely divided silicas such as fumed silica, precipitated silica, arc silica, silica aerogel, etc. In addition to the above, finely divided clays, asbestos and mica can also be used. Various amounts of the siliceous filler can be employed depending upon the specific results desired. In general, however, from about 10% to about 80%, preferably from about 20% to about 60% of siliceous filler based on the weight of the polymer will be employed. The preferred amount will depend on the particular siliceous filler, particularly its particle size.

The reactive silanes employed in this invention are compounds containing functional amino or mercapto groups. The lower molecular weight silanes are generally clear liquids. As stated above, the silane will have the formula $R_3SiX$ wherein at least one R is an amino- or mercapto-substituted organic radical attached to silicon through a Si-C linkage and the other R's are the same or alkyl, arylalkyl, alkaryl, alkoxy, aryloxy, cycloalkoxy, arylalkoxy, alkanoyloxy, or halogen and X is alkoxy, aryloxy, cycloalkoxy, arylalkoxy, alkanoyloxy or halogen. Exemplary reactive silanes are the silanes containing amino-substituted groups such as aminoethyl triethoxysilane, aminopropyl triethoxysilane, aminopropyl trimethoxysilane, 1,2-diamino-n-butyl diethoxymethylsilane, N - (trimethoxysilylpropyl)ethylenediamine, N - (dimethoxymethylsilylisobutyl)ethylenediamine, aminomethoxypropyl dimethoxychlorosilane, aminoethoxyethyl triiodosilane, 3 -′diaminopropoxymethyl dimethylphenoxysilane, N - (tribromosilylmethoxypropyl)ethylenediamine, 3 - aminocyclohexyl - 1 - methyl triacetoxysilane, 3,4 - diaminocyclohexyl - 1 - ethyl dipropoxymethylsilane, 3,5 - diaminocycloheptyl - 1 - methoxyethyl trifluorosilane, etc.; and the silanes containing mercapto-substituted groups such as mercaptoethyl trimethoxysilane, mercaptoethyl trichlorosilane, mercaptopropyl trimethoxysilane, 1,2 - dimercapto-n-butyl diethoxymethylsilane, mercaptomethoxyethyl tribromosilane, mercaptoethoxypropyl dimethylphenoxysilane, 3 - mercaptocyclohexyl-1-ethyl trimethoxysilane, 2,3 - dimercaptocycloheptyl - 1-methyl tripropionyloxysilane, 4 - mercaptocyclohexyl-1-methoxypropyl diethoxyfluorosilane, etc. Chemical bonding of the filler to the polymer results from reaction of the functional groups with the chlorine on the chloromethyl side chain of the polymer. As stated above the reactive silane will be added either during compounding or before compounding. When adding before compounding, the silane will be reacted with the filler in an appropriate manner, reaction in the vapor phase being especially desirable. During compounding, the silane can be added in the liquid form either before or after the filler. In any event the silane must be added to the polymer and mixed in before the addition of the cross-linking agent. The amount of silane used is fairly critical, best results being obtained when an amount of from about 0.1 part per hundred to about 3.0 parts per hundred based on the polymer are used. The optimum amount will depend on the silane filler and method of addition. For example, the smaller amounts can advantageously be used when the silane is added to the filler before compounding.

The cross-linking agents, fillers and silane can be compounded or admixed with the polymer in any desired fashion. For example, they can be uniformly blended with the polymer by simply milling on a conventional rubber mill or a Banbury mixer. By this means, the ingredients are uniformly distributed throughout the polymer and uniform cross-linking is effected when the blend is subjected to heat. It is generally preferable to mill at temperatures within the range of from about 70° F. to about 200° F. However, the blends are highly scorch resistant below about 250° F. Other methods of compounding the ingredients with the polymer will be apparent to those skilled in the art.

The conditions under which the cross-linking is effected can be varied over a wide range. Cross-linking can be effected in minutes at temperatures around 300° F. or in days at room temperature. In general, the cross-linking temperature will be within the range of from about 250° F. to about 350° F. The time will vary inversely with the temperature and will range from about 10 to about 120 minutes and preferably from about 20 minutes to about 60 minutes. Cross-linking will generally be conducted under a compression of about 500 p.s.i. in a suitable press, although it can be conducted in the open without pressure.

In addition to the cross-linking agents, fillers, and silane, other ingredients can also be incorporated. The additives commonly used in rubber vulcanization can be used here also, as, for example, extenders, pigments, plasticizers, softeners, processing lubricants, stabilizers, etc. The presence of a stabilizer and, in particular an acid acceptor, such as a lead compound (e.g., red lead oxide, etc.), calcium stearate or magnesium oxide is particularly beneficial.

The following examples will illustrate the invention, all parts and percentages being by weight.

General procedure for compounding of compositions

In all of the examples, polymer stocks were made up by mixing on a two-roll mill. The temperatures of the rolls were maintained at approximately 160° F. (front roll) and 190° F. (back roll) during the entire compounding procedure. The polymer was first added to the mill and when it banded (within about 2 minutes) a processing lubricant was added, followed by the complete addition of the siliceous filler. In those cases where the silane was added during compounding, it was added following the siliceous filler. After the addition of the filler and silane the composition was allowed to stand a minimum of 16 hours prior to the incorporation of antioxidant, acid acceptor stabilizer and cross-linking agent. On completion of the addition of compounding ingredients, the milling sheet was crosscut 12 times and end-rolled 6 times to insure a good dispersion of the compounding ingredients. All stocks were cured in two-part preheated steel molds maintained at 340° F. under a mold pressure of approximately 550 p.s.i. Specimen thickness was approximately 32 mils. The cured sheets were allowed to cool to room temperature over a minimum of 2 hours prior to cutting specimens for testing.

Examples 1 and 2

In these examples, epichlorohydrin-ethylene oxide copolymer was milled and cross-linked with 2-mercaptoimidazoline. All of the polymers in the examples were filled with fumed silica. The polymer in Example 1 contained no silane. The polymer in Example 2 contained a reactive silane added during compounding. The cure time was 45 minutes in each example. The amounts of the ingredients (by parts) in each formulation along with various physical properties of the cross-linked products and cut threads from the cross-linked products are given in Table I.

TABLE I

| | 1 | 2 |
|---|---|---|
| Epichlorohydrinethylene oxide copolymer (68 wt. percent epichlorohydrin RSV 5.0) | 100 | 100 |
| Zinc stearate | 0.75 | 0.75 |
| Fumed silica (surface area 325 sq. m./g.) | 30 | 30 |
| γ-Aminopropyl triethoxysilane | | 1.0 |
| Nickel dibutyl dithiocarbamate | 1.0 | 1.0 |
| Zinc oxide | 2.0 | 2.0 |
| Red lead | 3.0 | 3.0 |
| 2-mercaptoimidazoline | 1.5 | 1.5 |

| | Unaged | Aged [a] | Unaged | Aged [a] |
|---|---|---|---|---|
| 300% modulus, p.s.i | 650 | 1,220 | 1,095 | 1,450 |
| 500% modulus, p.s.i | 1,115 | 2,790 | 2,310 | 2,780 |
| Tensile strength, p.s.i | 5,090 | 3,460 | 5,880 | 3,580 |
| Maximum elongation, percent | 940 | 550 | 860 | 580 |
| Shore "A" hardness | 74 | 74 | 69 | 76 |
| Break set, percent | 10 | | 15 | |
| Graves tear, lbs./inch | 240 | | 285 | |
| Flex life (flexes to break 10 threads) [b] | 15,000 | | 19,000 | |
| Percent change in 300% modulus after boiling in water for 2 hours 1st cycle out/return [c] | −34.2/−17 | | +8.2/+6.6 | |
| Percent change in 300% modulus after aging 10 days in 300 p.s.i. O$_2$ at 150° F.[c] | −54.7/−33.6 | | +2.1/+6.2 | |

[a] 1 day/300° F. in air-circulating oven.
[b] Ten cut threads of about 6,600 denier are flexed to 300% elongation and back to 50% elongation at a rate of 100 cycles per minute.
[c] The polymers were treated while stretched to 100% elongation.

Examples 3–5

In these examples, epichlorohydrin-ethylene oxide copolymer was milled and cross-linked with 2-mercaptoimidazoline. All of the polymers in the examples were filled with fumed silica. The polymer in Example 3 contained no silane. In Examples 4 and 5 a reactive silane was added to the silica filler prior to compounding. The cure time was 45 minutes in each example. The amounts of the ingredients (by parts) in each formulation along with various physical properties of the cross-linked products and cut threads from the cross-linked products are given in Table II.

TABLE II

| | 3 | 4 | 5 |
|---|---|---|---|
| Epichlorohydrinethylene oxide copolymer (68 wt. percent epichlorohydrin, RSV 5.0) | 100 | 100 | 105 |
| Zinc stearate | 0.75 | 0.75 | 0.75 |
| Fumed silica [a] (containing 0.3% γ-aminopropyl triethoxysilane) | | 30 | |
| Fumed silica [a] (containing 1.0% γ-aminopropyl triethoxysilane) | | | 30 |
| Fumed silica [a] | 30 | | |
| Zinc oxide | 2.0 | 2.0 | 2.0 |
| Red lead | 3.0 | 3.0 | 3.0 |
| Nickel dibutyl dithiocarbamate | 1.0 | 1.0 | 1.0 |
| 2-mercaptoimidazoline | 1.5 | 1.5 | 1.5 |

| | Unaged | Aged [b] | Unaged | Aged [b] | Unaged | Aged [b] |
|---|---|---|---|---|---|---|
| 300% modulus, p.s.i | 680 | 1,210 | 745 | 1,260 | 800 | 1,305 |
| Tensile strength, p.s.i | 5,220 | 3,690 | 5,370 | 3,680 | 4,500 | 3,425 |
| Elongation, percent | 890 | 615 | 915 | 645 | 820 | 610 |
| Shore "A" hardness | 68 | 72 | 71 | 74 | 73 | 74 |
| Graves tear, lbs./inch | 201 | | 218 | | 238 | |
| Flex life (flexes to break 10 threads) [c] | 11,300 | | 17,000 | | 13,000 | |

[a] Surface area 325 sq. m./g.
[b] 1 day/300° F. in air-circulating oven.
[c] See Table I.

Examples 6–8

In these examples, epichlorohydrin-ethylene oxide copolymer was milled and cross-linked with 2-mercaptoimidazoline. All of the polymers in the examples were filled with fumed silica. The polymer in Example 6 contained no silane. The polymers in Examples 7 and 8 contained a reactive silane added during compounding. The cure time was 45 minutes in each example. The amounts of the ingredients (by parts) in each formulation along with various physical properties of the cross-linked products and cut threads from the cross-linked products are given in Table III.

num silicate. The polymer in Example 11 contained no silane while the polymer in Example 12 contained a reactive silane added during compounding. The cure time was 45 minutes in each example. The amounts of the ingredients (by parts) in each formulation along with

TABLE III

|  | 6 | | 7 | | 8 | |
|---|---|---|---|---|---|---|
| Epichlorohydrin-ethylene oxide copolymer (68 wt. percent epichlorohydrin, RSV 5.0) | 100 | | 100 | | 100 | |
| Zinc stearate | 0.75 | | 0.75 | | 0.75 | |
| Fumed silica (surface area 200 sq. m./g.) | 30 | | 30 | | 30 | |
| N(trimethoxysilylpropyl)ethylenediamine | | | 1.0 | | | |
| N(dimethoxymethylsilylisobutyl) ethylenediamine | | | | | 1.0 | |
| Zinc oxide | 2.0 | | 2.0 | | 2.0 | |
| Red lead | 3.0 | | 3.0 | | 3.0 | |
| Nickel dibutyl dithiocarbamate | 1.0 | | 1.0 | | 1.0 | |
| 2-mercaptoimidazoline | 1.5 | | 1.5 | | 1.5 | |
|  | Unaged | Aged a | Unaged | Aged a | Unaged | Aged a |
| 300% modulus, p.s.i | 1,080 | 1,915 | 1,750 | 2,250 | 1,490 | 2,340 |
| 500% modulus, p.s.i | 1,720 | 3,520 | 3,580 | | 2,760 | |
| Tensile strength, p.s.i | 4,900 | 3,675 | 4,400 | 3,330 | 4,485 | 3,720 |
| Maximum elongation, percent | 710 | 515 | 565 | 395 | 650 | 430 |
| Shore "A" hardness | 74 | 77 | 73 | 75 | 70 | 69 |
| Break set, percent | 25 | 5 | 5 | 0 | 5 | 0 |
| Graves tear, lbs./inch | 218 | | 260 | | 245 | |
| Modulus at 300% elongation p.s.i.: | | | | | | |
| 1st cycle out/return | 747/357 | | 1,379/495 | | 1,151/462 | |
| 3rd cycle out/return | 407/316 | | 556/454 | | 517/417 | |
| Percent change in 300% modulus after aging 96 hours at 160° F., 1st cycle out/return | +32.7/+18.8 | | +3.6/+0.6 | | +11/+4.1 | | a 1 day/300° F. in air-circulating oven.

Examples 9 and 10

In these examples, epichlorohydrin-ethylene oxide copolymer was blended with amorphous and partially crystalline epichlorohydrin homopolymers. In each example the polymer blend was filled with fumed silica and a reactive silane was added during compounding. The cure time was 45 minutes in each example. The amounts of the ingredients (by parts) in each formulation along with various physical properties of the cross-linked products and cut threads from the cross-linked products are given in Table IV.

TABLE IV

|  | 9 | 10 |
|---|---|---|
| Epichlorohydrin-ethylene oxide copolymer (68 wt. percent epichlorohydrin, RSV 5.0) | 50 | 50 |
| Polyepichlorohydrin (16% crystallinity, RSV 1.6) | 50 | |
| Polyepichlorohydrin (amorphous, RSV 1.4) | | 50 |
| Zinc stearate | 0.75 | 0.75 |
| Arc silica (surface area 200 sq. m./g.) | 30 | 30 |
| Mercaptomethoxyethyl trichlorosilane | 1.0 | 1.0 |
| Zinc oxide | 2.0 | 2.0 |
| Red lead | 3.0 | 3.0 |
| Nickel dibutyl dithiocarbamate | 1.0 | 1.0 |
| 2-mercaptoimidazoline | 1.5 | 1.5 |
|  | Unaged | Unaged |
| 300% modulus, p.s.i | 1,320 | 1,450 |
| Tensile strength, p.s.i | 4,500 | 4,250 |
| Maximum elongation, percent | 750 | 725 |
| Shore "A" hardness | 68 | 72 |
| Break set, percent | 10 | 25 |
| Graves tear, lbs./inch | 280 | 295 |
| Flex Life (number of flexes to break 10 threads) a | 10,000 | 12,000 | a See Table I.

Examples 11 and 12

In these examples, polyepichlorohydrin was milled and cross-linked with 2-mercaptopyrimidine. The polymers in both examples were filled with hydrous alumivarious physical properties of the cross-linked products are given in Table V.

TABLE V

|  | 11 | 12 |
|---|---|---|
| Polyepichlorohydrin (amorphous, RSV 1.4) | 100 | 100 |
| Zinc stearate | 1.0 | 1.0 |
| Hydrous aluminum silicate (surface area 10 sq. m./g.) | 80 | 80 |
| Mercaptopropyl trimethoxysilane | | 1.0 |
| Calcium stearate | 2.0 | 2.0 |
| Zinc Oxide | 2.0 | 2.0 |
| 2-mercaptopyrimidine | 2.0 | 2.0 |
|  | Unaged | Unaged |
| 300% modulus, p.s.i | 420 | 550 |
| Tensile strength, p.s.i | 2,200 | 2,400 |
| Maximum elongation, percent | 750 | 725 |
| Shore "A" hardness | 60 | 62 |
| Graves tear, lbs./inch | 100 | 160 |

Examples 13 and 14

In these examples, polyepichlorohydrin was milled and cross-linked with hexamethylenediamine carbamate. The polymers in both examples were filled with wet ground mica. The polymer in Example 13 contained no silane while the polymer in Example 14 contained a reactive silane added during compounding. The cure time was 45 minutes in each example. The amounts of the ingredients (by parts) in each formation along with various physical properties of the cross-linked products are given in Table VI.

TABLE VI

|  | 13 | 14 |
|---|---|---|
| Polyepichlorohydrin (amorphous, RSV 1.4) | 100 | 100 |
| Zinc stearate | 1.0 | 1.0 |
| Wet ground mica (surface area 5 sq.m./g.) | 80 | 80 |
| 3,4-diaminocyclohexyl-1-methyl trimethoxysilane | | 1.0 |
| Calcium stearate | 2.0 | 2.0 |
| Zinc oxide | 2.0 | 2.0 |
| Hexamethylenediamine carbamate | 1.5 | 1.5 |
|  | Unaged | Unaged |
| 300% modulus, p.s.i | 400 | 500 |
| Tensile strength, p.s.i | 2,300 | 2,500 |
| Maximum Elongation, percent | 750 | 800 |
| Shore "A" hardness | 61 | 64 |
| Graves tear, lbs./inch | 100 | 170 |

What we claim and desire to protect by Letters Patent is:

1. In the process of cross-linking a polymer of epihalohydrin which comprises heating said polymer in admixture with from about 0.25% to about 10% by weight of the polymer of a cross-linking agent selected from the group consisting of urea, thiourea, ammonia, ammonium salts, polyamines, hydrogen halide salts of polyamines, polyamine carbamates and a combination of at least one metal compound selected from salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table and an agent selected from the group consisting of 2-mercaptoimidazolines and 2-mercaptopyrimidines the improvement of compounding said polymer with from about 10 parts per hundred by weight to about 80 parts per hundred by weight of a siliceous-type filler and from about 0.1 part per hundred by weight to about 3.0 parts per hundred by weight of a reactive silane having the formula $R_3SiZ$ wherein at least one R is an amino- or mercapto-substituted organic radical selected from the group consisting of hydrocarbon, ether and ester radicals attached to a silicon through a Si-C linkage and the other R's are alkyl, arylalkyl, alkaryl, alkoxy, aryloxy, cycloalkoxy, arylalkoxy, alkanoyloxy or halo radicals and Z is an alkoxy, aryloxy, cycloalkoxy, arylalkoxy, alkanoyloxy or halo radical, said epihalohydrin polymer being selected from the group consisting of homopolymers of epihalohydrins and copolymers of an epihalohydrin with at least one other epoxide and having a molecular weight of at least 40,000.

2. The process of claim 1 wherein the reactive silane has been added to the siliceous-type filler before compounding with the polymer.

3. The process of claim 1 wherein the reactive silane is added to the siliceous-type filler and polymer during compounding.

4. The process of claim 1 wherein the siliceous-type filler is fumed silica.

5. The process of claim 1 wherein the reactive silane is mercaptoethyl trimethoxysilane.

6. The process of claim 1 wherein the reactive silane is mercaptopropyl trimethoxysilane.

7. The process of claim 1 wherein the reactive silane is γ-aminopropyl triethoxysilane.

8. The process of claim 1 wherein the reactive silane is N(trimethoxysilylpropyl)ethylenediamine.

9. The process of claim 1 wherein the reactive silane is N(dimethoxymethylsilylisobutyl)ethylenediamine.

10. A cross-linked polymer of epihalohydrin prepared by compounding said polymer with from about 10 parts per hundred by weight to about 80 parts per hundred by weight of a siliceous-type filler and from about 0.1 part per hundred by weight to about 3.0 parts per hundred by weight of a reactive silane having the formula $R_3SiZ$ wherein at least one R is an amino- or mercapto-substituted organic radical selected from the group consisting of hydrocarbon, ether and ester radicals attached to silicon through a Si-C linkage and the other R's are alkyl, arylalkyl, alkaryl, alkoxy, aryloxy, cycloalkoxy, arylalkoxy, alkanoyloxy or halo radicals and Z is an alkoxy, aryloxy, cycloalkoxy, arylalkoxy, alkanoyloxy or halo radical, and heating said polymer is admixture with from about 0.25% to about 10% by weight of the polymer of a cross-linking agent selected from the group consisting of urea, thiourea, ammonia, ammonium salts, polyamines, hydrogen halide salts of polyamines, polyamine carbamates and a combination of at least one metal compound selected from salts of aromatic carboxylic acids, salts of aliphatic carboxylic acids, salts of carbonic acid, salts of phosphorous acid, salts of silicic acid and oxides of the metals of Groups II–A, II–B and IV–A of the Periodic Table and an agent selected from the group consisting of 2-mercaptoimidazolines and 2-mercaptopyrimidines, said epihalohydrin polymer being selected from the group consisting of homopolymers of epihalohydrins and copolymers of an epihalohydrin with at least one other epoxide and having a molecular weight of at least 40,000.

References Cited

UNITED STATES PATENTS 3,288,754   11/1966   Green.

OTHER REFERENCES

Lee & Neville: Handbook of Epoxy Resins, McGraw-Hill, New York, 1967, pp. 2–16 to 2–19, 2–22, 2–27, 2–28, 2–31, 5–3 to 5–13, and 5–39.

ALLAN LIEBERMAN, Primary Examiner

H. H. FLETCHER, Assistant Examiner

PO-1050
(5/69)

UNITED STATES PATENT OFFICE
CERTIFICATE OF CORRECTION

Patent No. ___U.S.P. 3,510,444___   Dated ___May 5, 1970___

Inventor(s) ___Edwin J. Vandenberg & William D. Willis (Case 2)___

It is certified that error appears in the above-identified patent and that said Letters Patent are hereby corrected as shown below:

Col. 2, Line 29 of p.p.; Page 4, Line 12 of spec.
"transbutene 12 oxides" --should read-- "transbutene 2 oxides"

Col. 2, Line 49 of p.p.; Page 4, Line 30 of spec.
"at least 40,000" --should read-- "at least about 40,000"

Col. 2, Line 51 to 52 of p.p.; Page 4, Line 32 of spec.
"of at least about 0.5" --should read-- "of at least about 0.2 and preferably at least about 0.5."

Col. 6, Line 20 of p.p.; Page 11, Line 22 of spec.
"lex life" -- should read-- "flex life"

Table 2, Col. 5, Line of p.p.; Page 13, Table 2, Line 1, Col. 5 of p.p.;
"105" --should read-- "100"

SIGNED AND SEALED
SEP 8 - 1970

(SEAL)
Attest:

Edward M. Fletcher, Jr.
Attesting Officer

WILLIAM E. SCHUYLER, JR.
Commissioner of Patents